No. 877,525. PATENTED JAN. 28, 1908.
R. R. SMITH.
TACK AND NAIL LIFTER.
APPLICATION FILED FEB. 17, 1905.
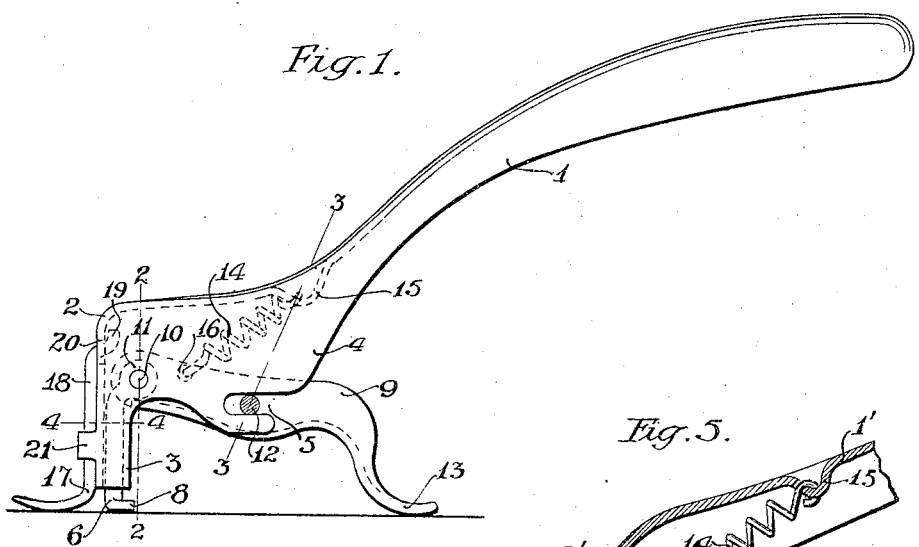
Fig. 1.
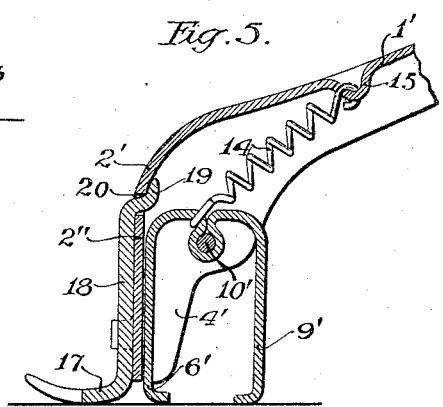
Fig. 5.
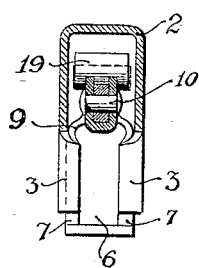
Fig. 2.
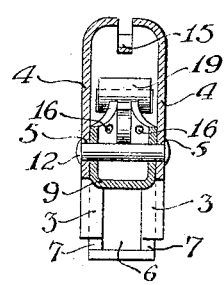
Fig. 4.
Fig. 3.
Witnesses:—
Inventor
Robt. R. Smith
by Chas. N. Butler
Attorney

UNITED STATES PATENT OFFICE.

ROBERT R. SMITH, OF PHILADELPHIA, PENNSYLVANIA, ASSIGNOR, BY MESNE ASSIGNMENTS, TO GENERAL SPECIALTY MANUFACTURING COMPANY, OF PHILADELPHIA, PENNSYLVANIA.

TACK AND NAIL LIFTER.

No. 877,525.     Specification of Letters Patent.     Patented Jan. 28, 1908.

Application filed February 17, 1905. Serial No. 246,028.

*To all whom it may concern:*

Be it known that I, ROBERT R. SMITH, a citizen of the United States, residing at Philadelphia, in the county of Philadelphia and State of Pennsylvania, have invented certain Improvements in Tack and Nail Lifters, of which the following is a specification.

This invention is designed to provide an improved implement which can be used interchangeably for lifting tacks, nails or staples from carpets, mattings, floors and the like, which can be manipulated readily, and which will exert a substantially straight pull, so that the object acted upon may be extracted with the minimum force and without bending or breaking.

A further purpose of the invention is to provide a structure that can be stamped to shape from sheet metal so that the parts can be readily formed, assembled and interchanged.

In the accompanying drawings, Figure 1 is a side view of an implement made in accordance with my invention: Fig. 2 is a sectional view taken on the line 2—2 of Fig. 1: Fig. 3 is a sectional view taken on the line 3—3 of Fig. 1: Fig. 4 is a sectional view taken on the line 4—4 of Fig. 1: and Fig. 5 is a vertical sectional view in illustration of a modified construction.

As shown in Figs. 1 to 4 inclusive, a lever 1 is pressed to shape from sheet metal, having the head 2 with the flanges 3 formed thereon and the flanges or cheeks 4 with the open parallel slots 5 therein. The head receives a leg or strut 6 with flanges 7 formed thereon which are engaged by the flanges 3 of the head, the leg having a foot 8 bent thereon for supporting it. A bent leg or strut 9, pressed to shape from sheet metal, is pivotally connected to the leg 6 by a pin 10 passing therethrough, the pin being inserted through a hole 11 therefor. The leg 9 is embraced by the cheeks 4 to which it is engaged by a pin 12 set in the leg and movably supported in the slots 5, the leg having a downwardly bent portion providing a foot 13 for supporting it. The lever 1 is thus fulcrumed upon the pin 12, and the head 2 is permitted to move vertically upon the leg 6 when the lever is depressed. The parts are held in the proper relation for operation by a spring 14 which is connected to a loop 15 pressed down from the body of metal in the lever and to the eye 16 of the leg 8. The claw 17 has the vertical shank 18 with the offset lug 19 thereon. The lug is inserted through and engaged in the opening or socket 20 therefor in the face of the head which is disposed substantially vertically and provides a support for the shank 18. Lugs 21 are struck out of the face and frictionally engage the shank to hold the claw in place while permitting it to be removed readily. When the claw is engaged with the article to be extracted, the lever or handle is pressed down and the legs supporting the thrust through the pin 12, the head and claw moving in a substantially vertical direction, whereby the article is lifted readily without bending or breaking.

As shown in Fig. 5, the lever 1' has the head 2' and flanges or cheeks 4'. Legs or struts 6' and 9' are formed integrally and bent so as to provide a bearing for a pin 10' which is set in the cheeks and fulcrums the lever. The legs are held in operative relation so that the leg 6' bears normally against the face 2'' of the head, by the spring 14, the spring being connected to the top of the leg 6' and to the loop 15 in the lever. As in the previously described form, the claw 17 has its shank 18 supported by having the top offset lug 19 thereof engaged in the hole or socket 20 in the face 2'', the lugs 21 frictionally engaging the shank.

It will be understood that in operation when the claw is engaged with the article to be extracted, the struts and particularly the rear strut will support the thrust from the lever, and the head, disposed transversely to the lever, lifts the claw in a substantially vertical direction.

Having described my invention, I claim:—

1. In an implement of the class described, a pair of struts pivotally connected together, and a lever fulcrumed at an intermediate point of one of said struts and having flanges which engage one or more of said struts.

2. In an implement of the class described, a lever having a head disposed transversely to the length thereof, said head having an opening therein and lugs thereon, in combination with a claw having a shank engaged in said opening and between said lugs, and mechanism on which said lever is fulcrumed.

In testimony whereof I have hereunto set my hand this 15th day of February, A. D. 1905, in the presence of the subscribing witnesses.

ROBERT R. SMITH.

Witnesses:
ROBERT JAMES EARLEY,
UTLEY E. CRANE, Jr.